United States Patent [19]

Ruben

[11] 4,127,709

[45] Nov. 28, 1978

[54] PROCESS FOR ELECTRO-PLATING NICKEL ON TITANIUM

[76] Inventor: Samuel Ruben, 52 Seacord Rd., New Rochelle, N.Y. 10804

[21] Appl. No.: 827,134

[22] Filed: Aug. 24, 1977

[51] Int. Cl.² .......................... C25D 5/42; H01M 4/16
[52] U.S. Cl. ..................................... 429/245; 204/29; 204/32 R; 204/40; 204/49; 429/225
[58] Field of Search .................. 204/29, 32 R, 40, 49; 428/660; 429/225, 245

[56] References Cited

U.S. PATENT DOCUMENTS 3,617,462  11/1971  DeWitt .............................. 204/268

FOREIGN PATENT DOCUMENTS 815,572  7/1959  United Kingdom .................. 204/32 R

OTHER PUBLICATIONS

Levy, Charles; Chromium Plating on Titanium Alloys; Metal Finishing, May 1960, pp. 49–50.

*Primary Examiner*—John H. Mack
*Assistant Examiner*—William Leader

[57] ABSTRACT

A process for electroplating nickel on titanium which comprises connecting the titanium as the cathode in an acid solution to form a layer of titanium hydride on the titanium and thereafter immersing the hydrided titanium in a nickel plating solution and cathodically plating nickel thereover.

8 Claims, No Drawings

PROCESS FOR ELECTRO-PLATING NICKEL ON TITANIUM

This invention relates to a process for electroplating titanium, particularly to the plating of nickel on titanium.

The object of the invention is to provide a process for producing an adherent electroplate of nickel on titanium capable of withstanding mechanical and thermal stress.

A specific object is the provision of a new and improved cathode for lead-sulfuric acid storage batteries utilizing a grid of nickel plated titanium made according to the process of this invention.

Other objects will be apparent as the disclosure proceeds.

Heretofore it has been very difficult to obtain a truly adherent electroplate on titanium, due to the fact that inherently titanium produces an integral oxide layer when exposed to air. This oxide layer makes it difficult, if not impossible, to obtain an effective bond to the titanium, and as a result, metal electro-deposits on titanium are non-uniform and mechanically weak. I believe I have overcome this difficulty by the process of this invention.

In instances where short life has been experienced in titanium grid batteries made in accordance with my U.S. Pat. No. 3,870,563, the failure has been traced to inadequate or defective nickel plate. On examination, the nickel plating has appeared to have flaked off in some areas, leading to anodic corrosion of the titanium base and cell polarization.

The process described in my said U.S. Pat. No. 3,870,563 consists of first degreasing the titanium, followed by chemical cleaning and water rinsing, and thereafter applying a thin nickel plating from a $NiSO_4$/$NiCl_2$/$H_3BO_3$ solution.

The process generally recommended for the plating of other metals on titanium involves the following first step, prior to the application of the plating:
1. Shot blast with ferrous metal shot, then apply immersion copper from the following solution, prior to electroplating. p2 Copper sulfate: 200 g/l
   Sulfuric acid: 40 g/l
   Aluminum sulfate: 24 g/l
   Wetting agent: 0.1%
2. Immerse for 1 minute at 210° F. in
   Sodium dichromate: 100 g/l
   Copper sulfate: 5 g/l
   Hydrofluoric acid (52%): 50 ml/l
   Rinse and Plate. Use of zinc sulfate instead of copper sulfate is stated to produce slightly better adhesion.
   Source: Guidebook & Directory, Metal Finishing (1977) p. 161.

The process of this invention consists in electroplating nickel on titanium by connecting the titanium as the cathode in an acid solution, such as sulfuric acid to form a layer of titanium hydride on the titanium and thereafter immersing the hydrided titanium in a nickel plating solution and cathodically plating nickel thereover, to form an adherent bond with the titanium capable of withstanding mechanical and thermal stress. Other acids capable of forming a layer of titanium hydride on the titanium, may be used in place of sulfuric acid. Dependent upon the proposed use of the materials, coatings of other metals such as lead, chromium, silver, gold, platinum, etc., may be plated upon the nickel surface.

The process may be further described by outlining the steps for producing an expanded titanium metal grid as a support for cathodic reactants in a lead sulfuric acid storage battery. For this application, not only is a good mechanical bond necessary, but also resistance of the titanium to anodic oxidation to avoid polarization effects.

In the production of these grids, the expanded titanium is first degreased in a solvent such as Xylol. It is then placed in a solution to dissolve the integral oxide surface layer, a satisfactory solution comprising 70 g/l ammonium bi-fluoride and 6 g/l of ammonium fluoride. The time of immersion is 70 seconds at room temperature. The titanium is then placed in a solution of 1.05 sp g sulfuric acid containing 1% of phosphoric acid and connected as the cathode for 10 minutes at a current of 0.01 amp per $cm^2$, a lead anode being used. During this process, some of the hydrogen cathodically evolved combines with the clean titanium surface to form a titanium hydride layer. The next step is prompt immersion in a nickel plating solution such as 350 grams $NiSO_4.6H_2O$, 45 g/l $NiCl_2.6H_2O$ and 35 g/l $H_3BO_3$, the grid being cathodically connected for 1.5 minutes at a current of 0.05 amp per $cm^2$, and thereafter washed with water. It is then immediately plated with the desired final metal plate, in this case, lead. The nickel coated grid is cathodically connected and immersed in a lead plating solution composed of 50% lead fluoborate solution with 2 parts per volume of water, a current of 0.04 amp per $cm^2$ being applied for 1½ hours, after which it is rinsed with water and air dried.

The coated titanium grid produced by the above process, when used as the support for the cathodic reactant, such as lead peroxide, in a leadsulfuric acid cell, is capable of withstanding the mechanical and thermal stresses incident to cyclic operation of the cell. The nickel coating which completely covers and is firmly bonded to the titanium in combination with the lead coating prevents anodic corrosion of the titanium base which would lead to cell polarization.

I claim:

1. A process for electro-plating nickel on titanium which comprises connecting titanium as the cathode in an acid electrolyte capable of forming a layer of titanium hydride on the titanium and forming a layer of titanium hydride on said titanium; and thereafter immersing the hydrided titanium in a nickel plating solution and cathodically plating nickel thereover.

2. The process of claim 1 characterized in that the electrolyte is sulfuric acid.

3. The process of claim 1 characterized in that the nickel plating solution comprises nickel sulfate, nickel chloride and boric acid.

4. The process of claim 1 characterized in that oxide on the surface of the titanium is removed prior to formation of the titanium hydride layer.

5. A process for electroplating nickel on titanium which comprises cleaning and removing any oxide from the surface of the titanium, cathodically forming a layer of titanium hydride on the surface of the titanium in an acid capable of forming titanium hydride and cathodically plating nickel thereover.

6. The process set forth in claim 5 characterized in that a lead plating is applied over said nickel plate.

7. As an article of manufacture a grid support for a cathodic reactant for lead-sulfuric acid storage battery cells made according to the process described in claim 1.

8. The method of producing a titanium base grid support for leadsulfuric acid storage batteries which comprises cleaning and removing oxide from the surface of a titanium grid, connecting the titanium as the cathode in an acid solution capable of forming titanium hydride and forming a layer of titanium hydride on the surface of the titanium, immersing the hydrided titanium in a nickel plating solution and cathodically plating nickel thereover to form an adherent bond with the titanium and thereafter cathodically plating lead on the nickel coated titanium.

* * * * *